United States Patent
Schricker et al.

(10) Patent No.: US 8,539,845 B2
(45) Date of Patent: Sep. 24, 2013

(54) FORCE-MEASURING RING HAVING AN ANNULAR HOUSING

(75) Inventors: Alexander Schricker, Graz (AT); Alparslan Turan, Graz (AT); Alexander Friedl, Graz (AT)

(73) Assignee: Piezocryst Advanced Sensorics GmbH, Graz (AT)

( * ) Notice: Subject to any disclaimer, the term of this patent is extended or adjusted under 35 U.S.C. 154(b) by 253 days.

(21) Appl. No.: 12/998,552

(22) PCT Filed: Feb. 26, 2009

(86) PCT No.: PCT/EP2009/052283
§ 371 (c)(1), (2), (4) Date: May 2, 2011

(87) PCT Pub. No.: WO2010/052029
PCT Pub. Date: May 14, 2010

(65) Prior Publication Data
US 2011/0219888 A1    Sep. 15, 2011

(30) Foreign Application Priority Data
Nov. 4, 2008    (AT) ................. A 1721/2008

(51) Int. Cl.
*G01L 1/04*    (2006.01)
*G01L 5/00*    (2006.01)
*G01L 1/00*    (2006.01)

(52) U.S. Cl.
USPC ............ 73/862.642; 73/862.636; 73/862.621; 73/862.381

(58) Field of Classification Search
USPC ...................................... 73/862.642
See application file for complete search history.

(56) References Cited

U.S. PATENT DOCUMENTS

| | | | | |
|---|---|---|---|---|
| 5,168,758 A * | 12/1992 | Wolfer | ............................ | 73/774 |
| 5,524,491 A * | 6/1996 | Cavalloni | ......................... | 73/587 |
| 5,966,802 A * | 10/1999 | Sonntag et al. | ................... | 29/714 |
| 7,350,494 B2 * | 4/2008 | Schricker et al. | .......... | 123/145 A |
| 7,493,836 B2 * | 2/2009 | Wolfer et al. | ................. | 73/866.5 |
| 7,603,906 B2 * | 10/2009 | Kroger et al. | .................... | 73/714 |
| 8,113,058 B2 * | 2/2012 | Baumgartner et al. | .......... | 73/723 |
| 2007/0245805 A1 * | 10/2007 | Schricker et al. | ............. | 73/35.12 |
| 2007/0277618 A1 * | 12/2007 | Kroeger et al. | ................. | 73/723 |
| 2010/0058875 A1 * | 3/2010 | Baumgartner et al. | .......... | 73/723 |

FOREIGN PATENT DOCUMENTS

AT    9920    5/2008

OTHER PUBLICATIONS

G. Gautschi, "Force Sensors" in *Piezoelectric Sensorics*, Springer, 2002, pp. 94-100.

* cited by examiner

*Primary Examiner* — Lisa Caputo
*Assistant Examiner* — Jamel Williams
(74) *Attorney, Agent, or Firm* — Dykema Gossett PLLC

(57) ABSTRACT

A force-measuring ring includes an annular housing which contains at least one piezoelectric measuring element, and a pressure transmission element which is attached to the housing via inner and outer circular-annular membrane areas. The inner and outer membrane areas of the force measuring ring are situated on opposite sides of a symmetry plane defined by the at least one piezoelectric measuring element.

10 Claims, 4 Drawing Sheets

FORCE-MEASURING RING HAVING AN ANNULAR HOUSING

BACKGROUND OF THE INVENTION

1. Field of the Invention

The invention relates to a force-measuring ring or load cell comprising an annular housing which contains at least one piezoelectric measuring element, and further comprising a pressure transmission element which is attached to said housing, preferably by welding, via inner and outer circular-annular membrane areas. The invention further relates to devices for measuring forces which are acting axially upon a shaft or a stamp.

2. The Prior Art

Force-measuring rings are used to measure forces, pressures, accelerations and moments, and for this purpose are inserted between force-transmitting means and engine parts.

From WO 2004/070334 A1 for instance there is known a measuring sensor with a pre-tensioning device, which essentially consists of an adapter part and an adapter sleeve. The adapter part has an integrated central tensioning sleeve, which extends into a central bore of the adapter sleeve and may be pre-tensioned there by means of a nut. A ring-shaped receiving space of the adapter sleeve carries a force-measuring ring, the measuring elements of the force-measuring ring being disposed in an annular housing and being covered by a membrane, which lies against the adapter part. The membrane is attached to the sensor housing by means of welding and is thus pre-tensioned.

FIG. 1 gives a more detailed description of the known force-measuring ring, which is for instance presented in G. GAUTSCHI, "Piezoelectric Sensors", Springer 2002. The force-measuring ring 1 has an annular housing 2, which forms a receiving space bounded by an inner flange 8 and an outer flange 9, and contains two piezoelectric measuring elements 5 and a pick-up electrode 6 disposed between those elements. The pick-up electrode 6 connects to a socket element 7 attached to the outer flange 9. The force acting on the force-measuring ring 1 is transmitted to the piezoelectric measuring elements 5 via the pressure transmission element 11. The pressure transmission element 11 has an inner membrane area 12 and an outer membrane area 13, which are welded to the inner flange 8 and the outer flange 9 of the housing 2, respectively. Force-measuring rings of this kind are suitable in conditions when the force to be measured is uniformly applied over the contact surface of the pressure transmission element 11. Such measurement conditions are described for instance in WO 2004/070334 A1 cited above.

There are applications, however, in which no uniform force distribution across the surface of the pressure transmission elements may be assumed. Measuring the axial force on a ball bearing as shown in FIG. 2 would be an example of such an application. In that case the force must be taken off from one of the two ball cages.

FIG. 2 shows in cross-section a rotating shaft 20 with a load in axial direction, the shaft axis being indicated by 20'. The ball bearing 21 sitting on the rotating shaft has an inner cage 22 and an outer cage 23, in which the balls 24 are held. In order to transmit force to the force-measuring ring 1, an annular intermediary part 25 is required to distribute the force uniformly over the force-measuring ring 1. Disadvantages of this arrangement are the great height and the higher elasticity of the measuring assembly.

It is the object of the present invention to improve a force-measuring ring of the kind described above in such a way that it may be used satisfactorily even under space limitations and with asymmetrical force input. In particular, the aim is to develop a robust force-measuring ring for measuring axial forces acting on an axial ball bearing.

SUMMARY OF THE INVENTION

According to the invention this object is achieved by providing that the inner and outer membrane area of the force-measuring ring lie on opposite sides of a symmetry plane defined by the at least one piezoelectric measuring element.

It is especially provided that the housing should have a first housing part with a ring-shaped inner flange and a first pressure transmission element as well as a second housing part with a ring-shaped outer flange and a second pressure transmission element, the inner membrane area being located between the inner flange and the second pressure transmission element and the outer membrane area being located between the outer flange and the first pressure transmission element. A force-measuring ring designed as proposed by the invention will feature high stiffness and small height and will as a consequence eliminate the need for an intermediary part for the force input surface of an axial ball bearing, for example.

The invention will now be described in more detail with reference to the enclosed drawings.

DETAILED DESCRIPTION OF THE PREFERRED EMBODIMENTS

Figure 1:
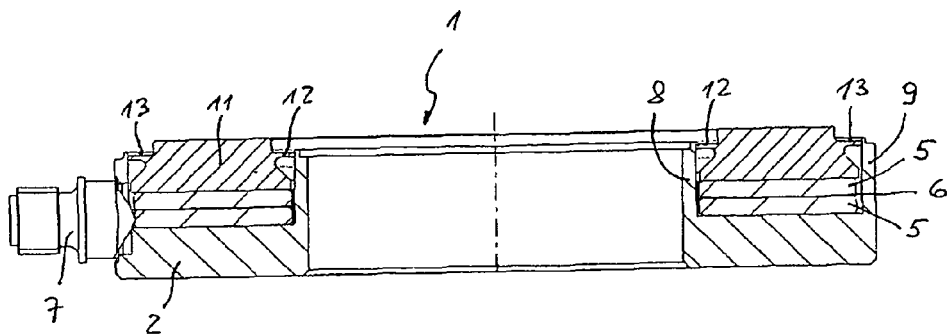
FIG. 1 an axial section of a state-of-the-art force-measuring ring.
Figure 2:
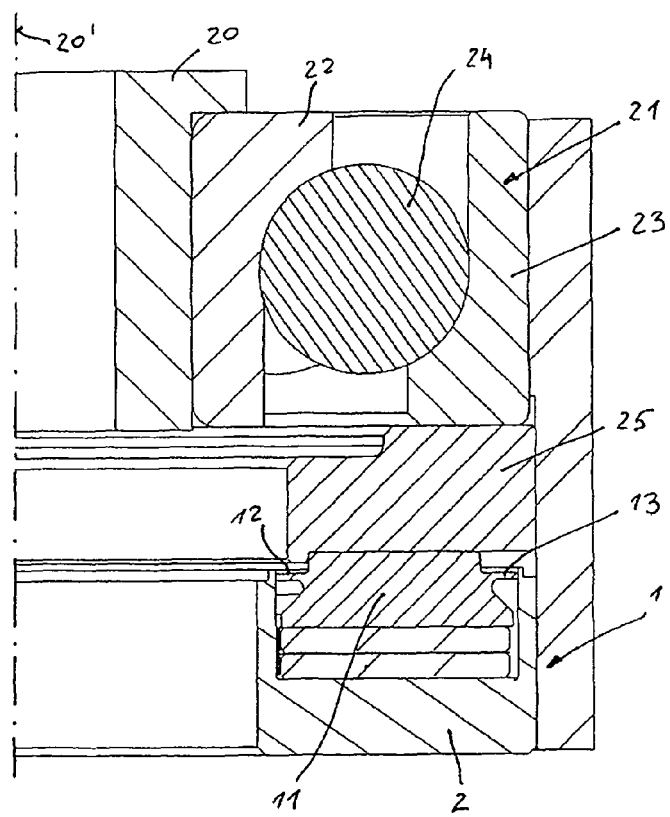
FIG. 2 a state-of-the-art force-measuring ring in an assembly for measuring the axial forces acting on an axial ball bearing.

The state-of-the-art force-measuring ring shown in FIGS. 1 and 2 and its assembled situation has already been described above.

Figure 3:
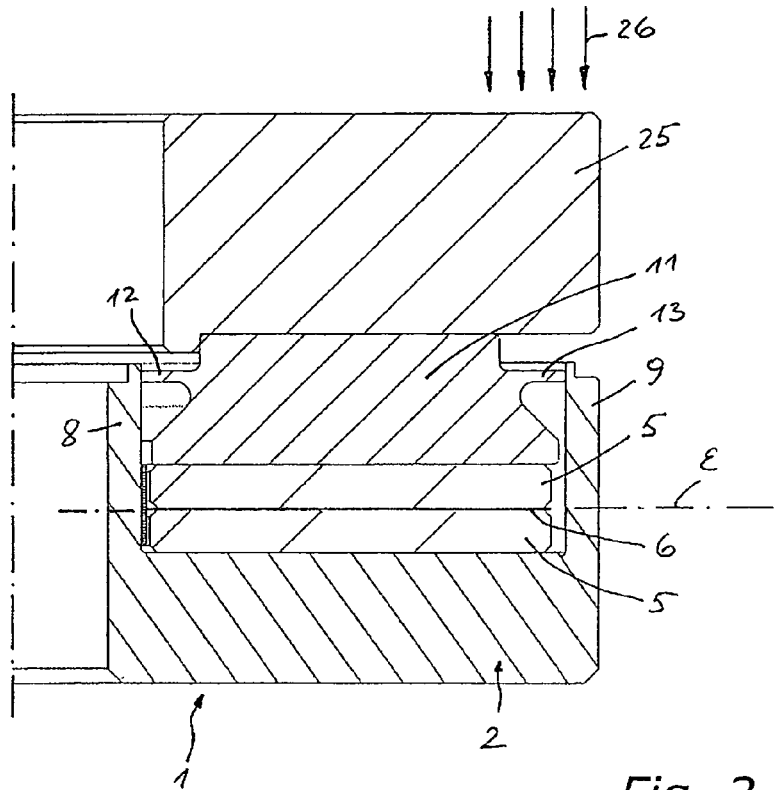
FIG. 3 an enlarged sectional view of the force-measuring ring of FIG. 2.
Figure 4:
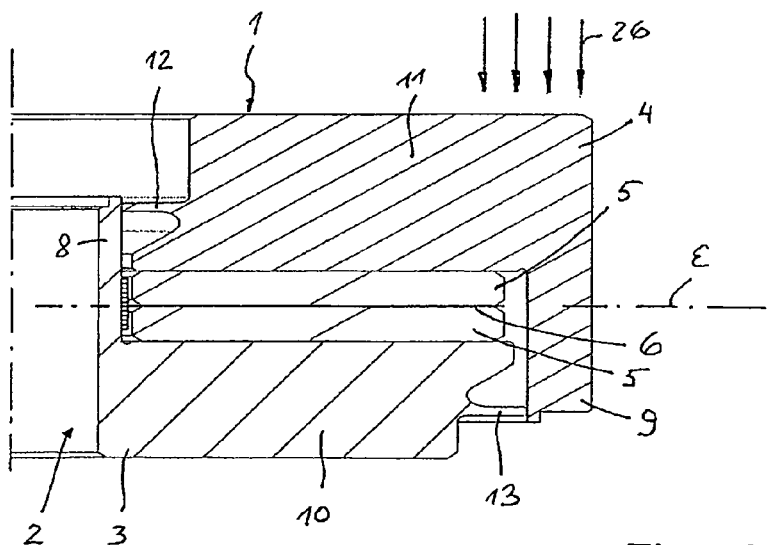
FIG. 4 a force-measuring ring according to the invention in sectional view.

FIGS. 3 and 4 present an illustrative comparison on a magnified scale of the differences between the invention (FIG. 4) and the state of the art (FIG. 3). In the case of the state-of-the-art force-measuring ring 1 the inner membrane area 12 and the outer membrane area 13 are located on one and the same side of the symmetry plane ε defined by the piezoelectric measuring element 5, respectively the stack of two or more measuring elements 5. In this way the two sides of the pressure transmission element 11 will be connected to the inner flange 8 and the outer flange 9 of the housing 2 only via the thin membrane areas 12, 13. To achieve uniform force input, an annular intermediary part 25 is required.

With the force-measuring ring 1 of the invention presented in FIG. 4 the situation is different. Its housing 2 has a first, lower housing part 3 with an annular inner flange 8 and a first pressure transmission element 10, as well as a second, upper housing part 4 with an annular outer flange 9 and a second pressure transmission element 11. The inner membrane area 12 is located between the inner flange 8 and the second pressure transmission element 11. The outer membrane area 13 is located between the outer flange 9 and the first pressure transmission element 10. In contrast to the state of the art the inner 12 and outer membrane area 13 lie on opposite sides of the symmetry plane ε defined by the piezoelectric measuring elements 5.

According to the invention the inner flange 8 together with the first pressure transmission element 10 and the outer membrane are 13 may be designed as an integral unit. The same holds for the outer flange 9, the second pressure transmission element 11 and the inner membrane area 12. This will result in a robust force-measuring ring which is torsionally stiff even under one-sided force input as shown in FIG. 4 (arrows 26) and does not require an annular intermediary part 25.

Furthermore the outer flange 9 may be made stronger than the inner flange 8, thus further enhancing the stiffness of the force-measuring ring.

In the example shown the outer membrane area 13 is welded to the outer flange 9 on its outer rim, while the inner membrane area is welded to the inner flange 8 on its inner rim. The inner flange 8 and the first pressure transmission element 10 are essentially L-shaped in cross-section. The same applies to the outer flange 9 and the second pressure transmission element 11.

In the same way as shown in FIGS. 1 to 3 for the state-of-the-art version, the force-measuring ring of the invention shown in FIGS. 4 to 7 may also be provided in the two-part housing 2 with two piezoelectric measuring elements 5, whose adjacent contact surfaces are in contact with a pick-up electrode 6. A socket element 7 (see FIGS. 6 and 7) may be located on the outer flange 9, in the same way as shown in FIG. 1.

Figure 5:
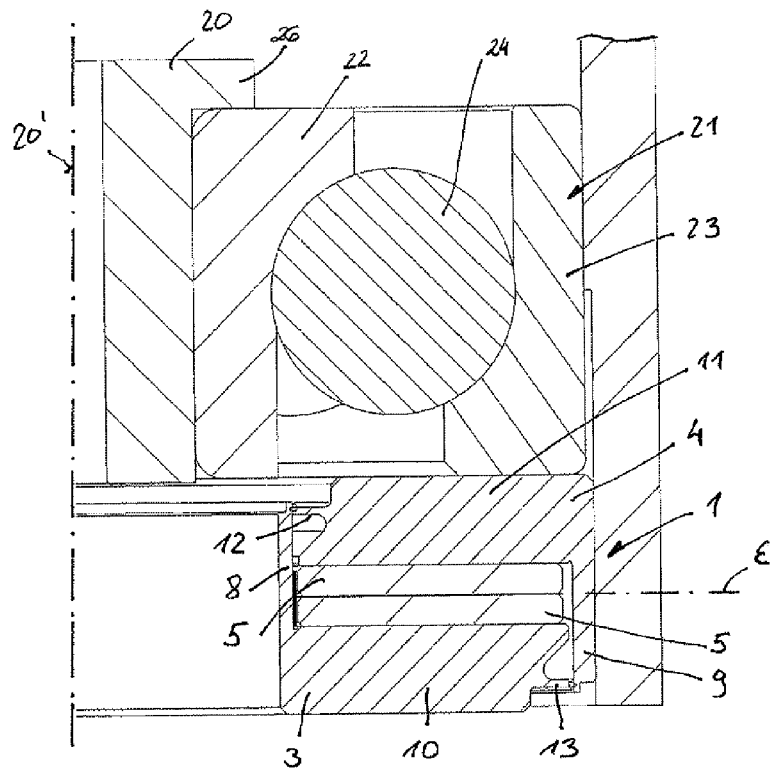
FIG. 5 a sectional view of a force-measuring ring according to the invention in an assembly such as shown in FIG. 2.

In FIG. 5 the force-measuring ring 1 of FIG. 4 is shown in an assembly for measuring the axial forces of an axial ball bearing 21. The intermediary ring 25 required for uniform force input with state-of-the-art force-measuring rings (see FIG. 2) need not be included in this case and the height of the measuring assembly will be substantially reduced. Via the interposed axial ball bearing 21 the shaft 20 is supported by the force-measuring ring 1, for instance by means of a shoulder 26 on the shaft 20.

Figure 6:
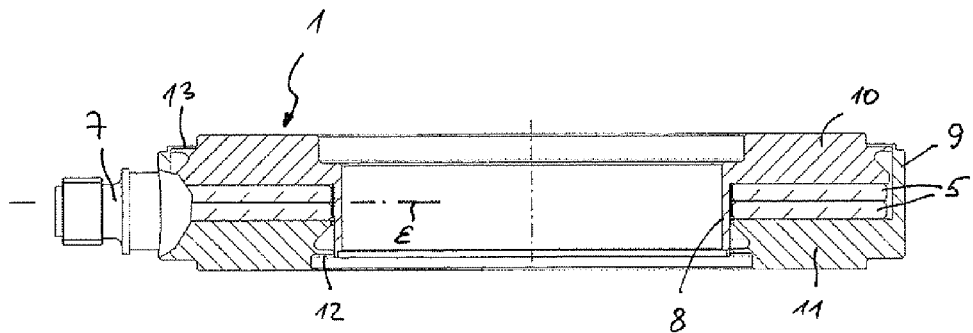
FIG. 6 and FIG. 7 further variants of the force-measuring ring of the invention in sectional view as in FIG. 1; and in FIG. 8 a sectional view of the force-measuring ring of the invention in a further assembled situation.
Figure 7:
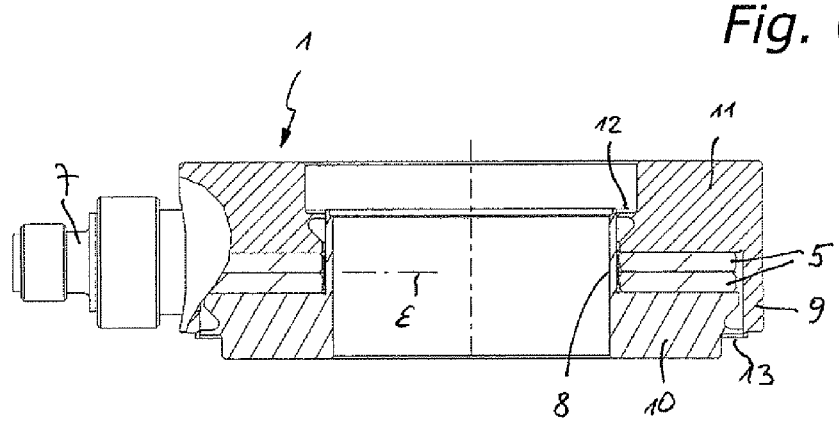

In FIGS. 6 and 7 there are shown variants of the force-measuring ring 1 of the invention with different dimensions and construction details.

Figure 8:
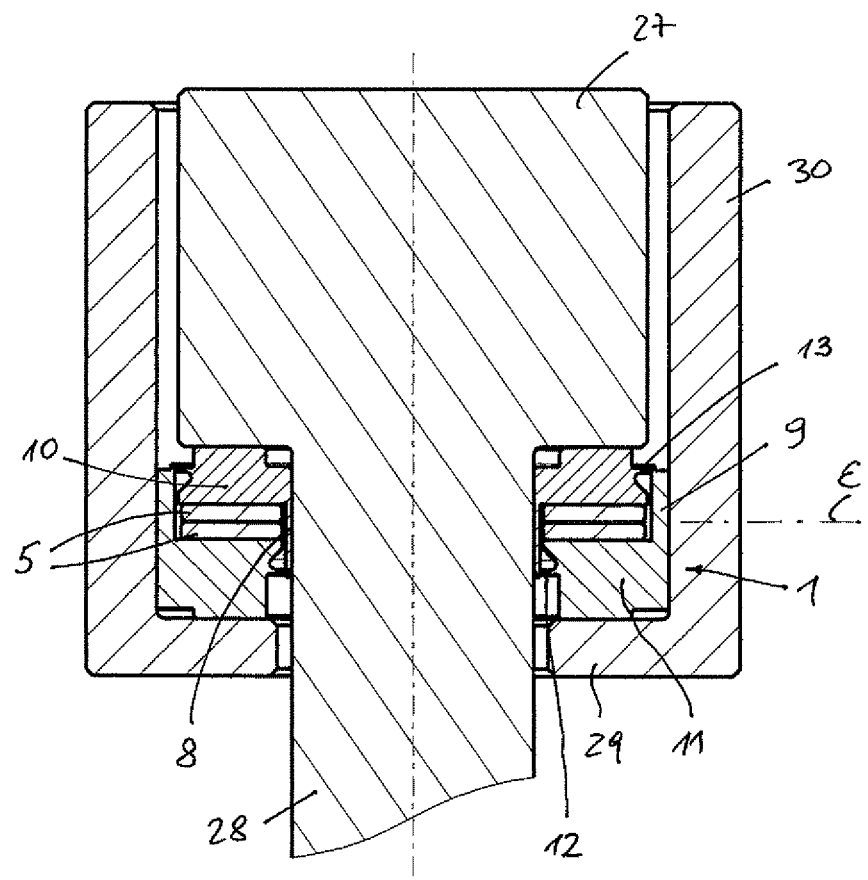

FIG. 8 shows a further advantageous example of an application of the present invention. The force-measuring ring 1 of the invention is here used in an assembly for measuring the force acting axially on a stamp 27. The shaft 28 of the stamp 27 on which the force to be measured is acting, passes through the force-measuring ring 1, with the shaft 28 touching the inner flange 8 of the force-measuring ring 1 and thereby being centered. In contrast to a state-of-the-art force-measuring ring the design of the force-measuring ring 1 according to the invention avoids relative movement between the shaft 28 and the inner flange 8, thus eliminating hysteresis effects during force measurement. The force-measuring ring 1 is supported by an interior flange 29 of the housing 30.

The invention claimed is:

1. A force-measuring ring comprising an annular housing containing at least one annular piezoelectric measuring element that defines a symmetry plane, the annular housing comprising:
  a first housing part with an annular inner flange, a first pressure transmission element and an outer membrane area, and
  a second housing part with an annular outer flange, a second pressure transmission element and an inner membrane area,
  said inner membrane area being located between the annular inner flange and the second pressure transmission element, and said outer membrane area being located between the annular outer flange and the first pressure transmission element,
  said inner membrane area and said outer membrane area being situated on opposite sides of said symmetry plane.

2. The force-measuring ring according to claim 1, wherein the inner membrane area and the outer membrane area are attached to the annular inner flange and the annular outer flange, respectively.

3. The force-measuring ring according to claim 1, wherein the annular inner flange, the first pressure transmission element and the outer membrane area are one-piece, and the annular outer flange, the second pressure transmission element and the inner membrane area are one-piece, respectively.

4. The force-measuring ring according to claim 1, wherein the outer membrane area is welded to the annular outer flange at an outer rim thereof, while the inner membrane area is welded to the annular inner flange at an inner rim thereof.

5. The force-measuring ring according to claim 1, wherein the annular inner flange and the first pressure transmission element define an essentially L-shaped cross section, and the annular outer flange and the second pressure transmission element define an essentially L-shaped cross section.

6. The force-measuring ring according to claim 1, wherein the annular outer flange is thicker than the annular inner flange.

7. The force-measuring ring according to claim 1, comprising two piezoelectric measuring elements and pick-up electrode sandwiched therebetween.

8. The assembly for measuring a force acting axially on a shaft comprising a force-measuring ring according to claim 1, wherein the shaft is supported by means of a shoulder of said shaft on the force-measuring ring having an axial ball bearing being interposed.

9. The assembly for measuring a force acting axially on a stamp comprising a force-measuring ring according to claim 1, wherein a shaft of the stamp passes through the force-measuring ring, said shaft touching the annular inner flange of the force-measuring ring and being centered by said annular inner flange.

10. A force-measuring assembly which comprises:
  an annular housing which includes opposing first and second generally L-shaped annular housing parts,
  said first generally L-shaped annular housing part including a first pressure transmission base having a first web part that extends in an outer direction, and an inner flange that extends from said first base in an axial direction, and
  said second generally L-shaped annular housing part including a second pressure transmission base having a second web part that extends in an inner direction and an outer flange that extends from said second base in an axial direction,
  said first web of said first base contacting said outer flange and said second web of said second base contacting said inner flange, and
  at least one annular piezoelectric measuring element positioned between said first and second bases and defining an imaginary symmetry plane, said first and second web parts being located on opposite sides of said imaginary plane.

* * * * *